United States Patent [19]
Purssell

[11] 3,831,127
[45] Aug. 20, 1974

[54] CONTROL SWITCH UNITS

[75] Inventor: Robert F. Purssell, Devon, England

[73] Assignee: Ranco Controls Limited, Devon, England

[22] Filed: Sept. 7, 1973

[21] Appl. No.: 395,078

[30] Foreign Application Priority Data
Sept. 9, 1972 Great Britain.................... 41981/72

[52] U.S. Cl................................. 337/321, 337/327
[51] Int. Cl........................................... H01h 37/04
[58] Field of Search ........... 337/117, 119, 121, 322, 337/321, 327

[56] References Cited
UNITED STATES PATENTS
2,688,064  8/1954  Traver ................................. 337/327
3,185,796  5/1965  Mamiya et al. ...................... 337/320
3,272,942  9/1966  Brandl ................................. 337/121

Primary Examiner—Roy N. Envall, Jr.
Attorney, Agent, or Firm—Watts, Hoffmann, Fisher and Heinke, Co.

[57] ABSTRACT

A temperature-responsive switch unit has a casing enclosing a bellows device and a switch unit arranged to be operated by the bellows device through a lever. To facilitate precision assembly the casing is made in two rigid parts, preferably die-cast, which fit together and which between them clamp the conduit leading to the bellows device, or a clevis surrounding this conduit, and the switch unit to locate and clamp the switch unit and the bellows device positively relative to each other.

16 Claims, 4 Drawing Figures

CONTROL SWITCH UNITS

BACKGROUND AND OBJECTS OF THE INVENTION

A common arrangement for a temperature-responsive electric switch of the kind used for controlling, for example, domestic space heating appliances, ovens, and washing machines has a sealed liquid-filled system comprising a bulb exposed to the temperature to be controlled and a capillary tube connecting the bulb with the interior of a chamber enclosed in a switch casing and defined by a bellows or diaphragm. Movement of the bellows or diaphragm in response to thermal expansion or contraction of the liquid filling is arranged to operate an electrical switch located in the casing at a predetermined temperature or temperatures at the bulb.

An example of a switch unit of this type is described in our United Kingdom Patent Specification No. 1187852.

Switch units of the above mentioned type must be assembled with high precision because the actual displacement of the switch actuating element between the "on" and "off" positions of the switch is usually very small. The switch casing is usually formed from a sheet metal stamping, and the accurate location of the diaphragm or bellows unit in the casing is a time-consuming and therefore expensive operation, involving the introduction of a capillary tube communicating with the diaphragm, or bellows chamber through a slot in the casing wall and the accurate fixing of the bellows or diaphragm in position.

An object of the present invention is to provide an improved control switch unit which is of simplified construction and readily adaptable to precision quantity production.

Another object of the invention is to provide a switch unit as aforesaid in which the conduit is clamped and located positively within the casing upon assembly of the unit without loss of precision.

A further object of the invention is to provide a switch unit as aforesaid in which the switch operated by the bellows device is positively located within the casing, thereby facilitating rapid assembly of the unit with a high degree of precision.

SUMMARY OF THE INVENTION

According to the invention there is provided a control switch unit of the kind comprising a casing enclosing a diaphragm or bellow device defining a chamber communicating with a conduit extending outwardly of the casing, and a switch arranged within the casing for operation by the diaphragm or bellows device, in which the casing comprises two rigid parts between which the conduit or a boss surrounding the conduit is clamped and located.

The casing parts, which are preferably in the form of metal castings, may have recesses which together define an aperture in which a boss or clevis surrounding the conduit is located upon assembly of the casing parts. In a preferred embodiment of the invention the recesses defining the said aperture are formed by respective semi-circular flanges on the casing parts which engage in a circumferential groove in the boss or clevis.

The diaphragm or bellows may be connected mechanically to an actuating element of the switch by a lever pivoted within the casing and engaging a movable part of the diaphragm or bellows device.

The pivotal support for the lever may include a resilient mounting which accommodates overtravel of the lever in the event of a pressure in the chamber outside the designed operating range of the unit.

The lever is preferably in the form of a plate having pivotal supports comprising two spaced apart bearing points one of which is variable in position relative to the other by means of an externally adjustable member.

In a preferred embodiment of the invention a leaf spring is attached to the lever plate, the spring having a portion which normally lies flat against the plate and which bears against the switch actuating element at a position spaced from the attachment of the spring to the plate, the leaf spring deflecting away from the plate in the event of excessive movement of the diaphragm or bellows device outside the normal operating range of the unit. The leaf spring, by accommodating overtravel of the diaphragm or bellows, prevents damage to the latter or to the spring.

One of the bearing points for the lever plate may comprise a cam surface on a rotatable cam adjustable externally of the casing. The plate may engage the diaphragm or bellows on a face of the plate opposite that which engages the switch actuating element.

The casing parts may be bolted or screwed together upon assembly of the unit. In a preferred embodiment of the invention, however, the casing parts are held together by at least one pair of interengaging or interlocking elements formed integrally with the casing parts. One element of the or each said pair may be upset or deformed after assembly of the unit to lock the casing parts together.

THE DRAWINGS

The invention will now be described, merely by way of example, with reference to the accompanying drawings, in which.

DESCRIPTION OF THE ILLUSTRATED EMBODIMENT

Figure 1:
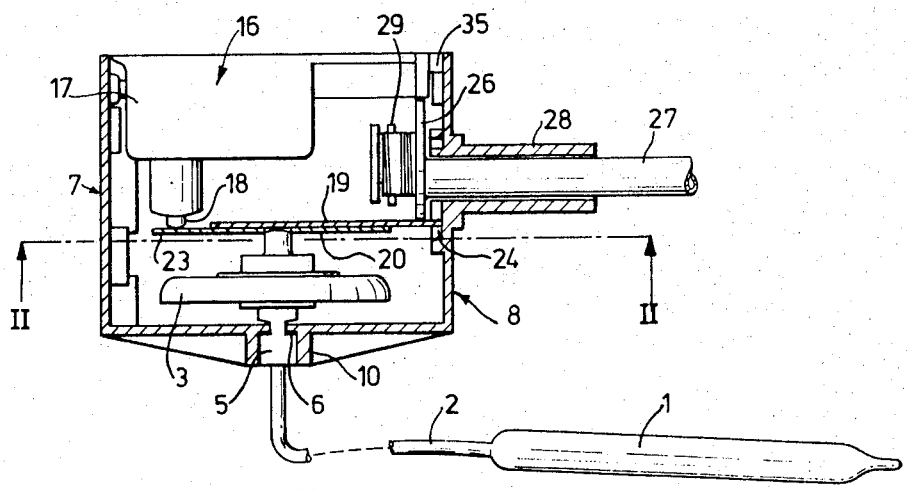
FIG. 1 is a diagrammatic axial sectional view of a control switch unit according to one embodiment of the invention, taken on line I—I in FIG. 2.

Referring to the drawings, the illustrated control switch unit according to the invention is a temperature sensitive switch unit adapted to perform an electrical switching function in response to a temperature change sensed at a given site, for example in an oven or water heater. A bulb 1 is located at the site in question and communicates by way of a capillary conduit 2 with the internal chamber of a bellows or capsule device 3, the bulb 1, the conduit 2 and the bellows chamber forming a sealed liquid-filled system so that the bellows device 3 is responsive to thermal expansion and contraction of the sealed liquid filling. The bellows device 3 has a flexible wall provided centrally with a button 4 which moves in the direction of the axis of symmetry of the bellows device 3 in response to temperature changes sensed at the bulb 1.

Figure 4:
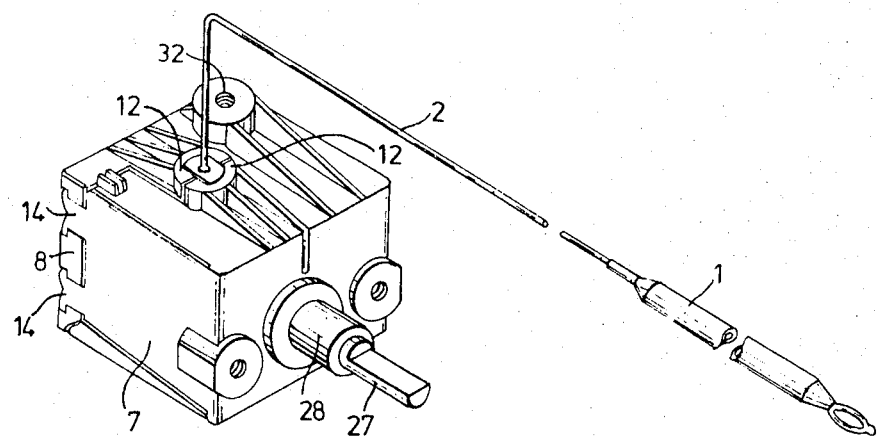
FIG. 4 is a perspective view of the assembled unit.

On its side remote from the button 4 the bellows device 3 is provided with a clevis 5 secured to and surrounding the conduit 2. The clevis 5 has a circumferential groove 6 defining a waisted portion of circular cross section. The clevis 5 is clamped between two rigid casing parts 7, 8 which upon assembly form a rectangular casing which is substantially square in plan, as shown in FIG. 4. Along one pair of abutting edges the two casing parts are formed with mating semi-circular flanges 9, 10 which upon assembly of the unit engage in the circumferential groove 6 of the clevis 5 to hold the latter rigidly in position. Between the groove 6 and the conduit 2 the clevis 5 is formed with parallel flat shoulders 11 (FIG. 4) on opposite faces. An upstanding semi-cylindrical wall 12 surrounds each flange 9, 10 on the external surface of each casing part 7, 8, the two walls 12 co-operating upon assembly of the unit to define a well of non-circular cross section in which the part of the clevis 5 between the groove 6 and the conduit 2 is received. The surfaces of the walls 12 which face each other are formed with flat surfaces which upon assembly of the unit engage the flat shoulders 11 of the clevis 5 thereby effectively locking the latter against rotation about its axis, so that the combined action of the flanges 9, 10 and the walls 12 is to clamp and locate positively the clevis 5 and, therefore, the bellows device 3.

Figure 3:
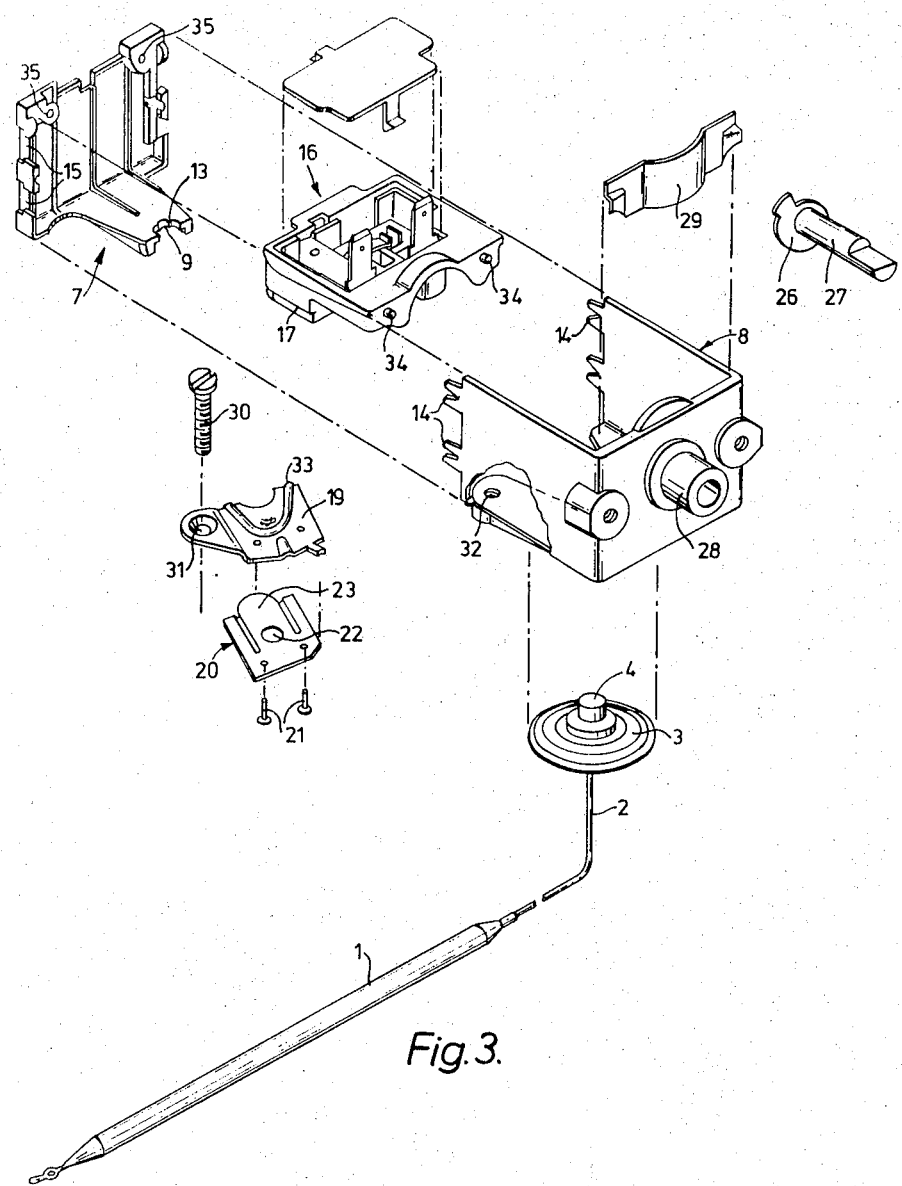
FIG. 3 is an exploded perspective view showing the disassembled components of the switch unit.

To ensure tight clamping of the clevis 5 upon assembly of the unit the edges of the semi-circular flanges 9, 10 which face each other are formed with raised ribs or protuberances 13 which are upset or deformed by engagement with the surface of the clevis 5 upon clamping of the two casing parts 7, 8 together (FIG. 3).

The two casing parts 7, 8 may conveniently comprise complementary castings of metal, for example of aluminium or zinc alloy, or may comprise rigid plastics shells. The two casing parts 7, 8 may be bonded together along their mating edges, or may be clamped together by two or more tie bolts (not shown). In this example, however, the casing parts 7, 8 are held together by respective pairs of bifurcated stakes 14, formed integrally with opposite parallel edges of one of the casing parts 8 and adapted to engage in complementary slots 15 in the co-operating edges of the other casing part 7. After assembly of the two casing parts 7, 8 and full engagement of the stakes 14 in the slots 15 the bifurcated ends of the stakes 14 are splayed apart, as shown in FIG. 4, to clamp the casing parts 7, 8 together.

A switch 16 having a housing 17 of plastics material is located within the two-part casing and is arranged to be operated by the bellows device 3 when the bulb 1 is subjected to a predetermined temperature, the operating point of the switch being manually presettable, as hereinafter described.

The switch 16 may have more than one set of contacts arranged for operation at different respective temperatures, sensed at the bulb 1, but in the illustrated embodiment of the invention the switch 16 has a single actuating element 18 which is spring loaded and which operates associated switch contacts (not shown), when displaced by a small predetermined amount. The switch-operating displacement of the actuating element 18 is caused by movement of the button 4 of the bellows device 3, through the action of a lever in the form of a rigid metal plate 19 which engages both the button 4 and the switch actuating element 18.

Figure 2:
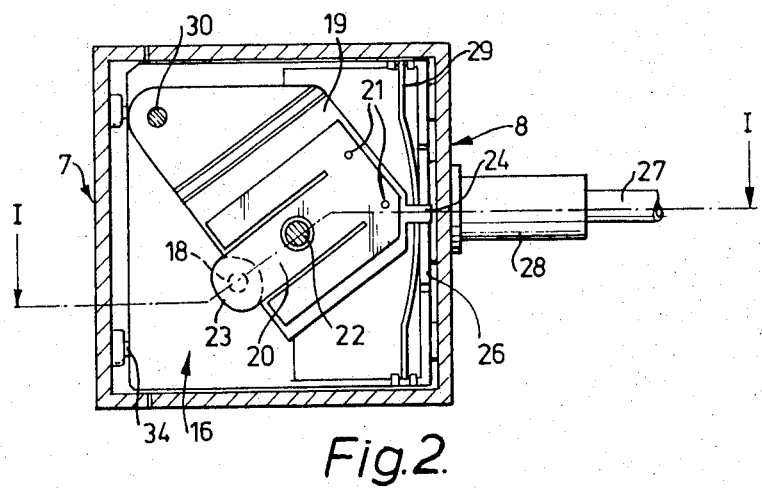
FIG. 2 is a diagrammatic transverse sectional view of the unit, taken on line II—II in FIG. 1.

The plate 19 carries a leaf spring 20 of spring steel strip affixed to the plate by bolts or rivets 21 adjacent one edge of the spring 20. The leaf spring 20 lies flat against the plate 19 and has a central hole 22 through which the button 4 of the bellows device 3 passes to engage the plate 19 itself. The edge of the spring 20 opposite that which is anchored to the plate 19 projects beyond the plate 19 in the form of a rounded tongue 23 which engages the switch actuating element 18. The plate 19 has an integral projection 24 which is located in a rectangular slot 25 (FIGS. 1 and 2) in the casing part 8 for limited movement in the slot in a direction perpendicular to the plane of the plate 19.

A pre-setting cam 26 is located within the switch casing and is mounted on a rotatable shaft 27 which is journalled in and passes through an integral sleeve 28 formed in the casing part 8. The end of the shaft 27 projecting externally of the casing part 8 may be notched or splined to receive a knob (not shown) for effecting manual adjustment of the cam 26, which has a shaped edge against which the projection 24 of the lever plate 19 bears. The cam 26 is pressed against the internal surface of the casing part 8 by a bowed spring strip 29 the ends of which are seated in internal slots in the casing part 8.

A pin 30 having a rounded head engages in a countersunk hole 31 in the lever plate 19 and is screwed into a tapped hole 32 in the casing part 8, forming a fixed pivot for the latter opposite the projection 24. The end of the pin 30 screwed into the hole 31 is slotted for engagement by a screwdriver to enable the position of one of the pivot bearing points of the plate 19, namely the head of the pin 30, to be adjusted externally upon calibration and setting of the unit.

The central button 4 of the bellows device 3 bears against one face of the lever plate 19 through the hole 22 in the leaf spring, and the opposite face of the plate 19 is, in effect, supported at three bearing points namely at the head of the pin 30, at the edge of the cam 26 which bears against the projection 24, and at the switch actuating element 18. Under normal operating conditions the leaf spring 20 lies flat against the plate 19 and therefore movement of the button 4 of the bellows device 3 in response to temperature changes in the liquid-filled bulb 1 will cause rocking movement of the plate 19 such as to depress or release the switch-actuating element 18, according to the sense of the movement of the button 4. The switch-operating pivotal movement of the lever plate 19 takes place about an axis interconnecting the rounded head of the pin 30 and the point of contact of the projection 24 with the edge of the cam 26. The precise orientation of this axis is adjustable by rotation of the cam shaft 27 to cause operation of the switch 16 when a predetermined temperature is sensed at the bulb 1.

The leaf spring 20 serves a useful purpose in allowing for overtravel of the bellows device. Where manual switching off of the switch 16 is required when the bellows device 3 is fully expanded, some provision must be made to prevent damage to the switch 16, the lever plate 19 or the bellows device 3 itself. Such damage is avoided in this embodiment of the invention by resilient flexing of the leaf spring 20. In the event of the cam 26 being rotated to the "OFF" position corresponding to opening of the switch 16 with the bellows device 3 fully expanded, the force exerted by the bellows device 3 on the plate 16 causes the leaf spring 20 to bend away from the face of the lever plate 19 against which it normally lies, thereby accommodating the overtravel of the button 4 of the bellows device 3 without damage.

It is important that flexing of the lever plate 16 itself should be avoided, and for this purpose the plate 16 may conveniently be reinforced against flexing by one or more embossed ridges or ribs, one of which is illustrated at 33 in FIG. 3.

The split casing construction of the switching unit according to the invention permits the accurate location and fixing of the switch 16 itself within the casing upon assembly of the unit. For this purpose the switch housing 17 is provided with integrally moulded projecting pins or lugs 34 on opposite sides of the housing 17, which upon assembly of the unit engage in pre-cast sockets 35 in the two casing parts 7, 8. In this way the housing 17, and therefore the switch 16 and its actuating element 18, are accurately located in the unit, relative to the bellows device 5, which is located within the two-part casing by the clamping of the clevis 5, as described previously.

In the illustrated embodiment the plastics switch housing 17 has lateral flanges formed with ramp surfaces 36 which are inclined to the direction of approach, indicated by broken lines A, of the two parts 7, 8 to interengagement. These ramp surfaces 36 cooperate with complementarily inclined edges 37 of the casing part 8 to achieve a jamming or wedging action when the casing parts 7, 8 are fully interengaged (FIG. 4), thereby eliminating any play which might otherwise exist between the pins or lugs 34 and the sockets 35 upon assembly of the unit.

The switch unit according to the invention can be installed in a compact space in a casing of generally square form. By providing a split casing the invention provides a convenient and precise clamping and locating arrangement for the bellows device 3 and the switch 16 operated thereby, greatly facilitating the assembly of the switch unit in quantity production.

It will be appreciated that other types of thermally expanding device than the bellows device shown in the illustrated embodiment may be used in the switch unit of the invention, and other variants may be made in practical embodiments of the invention without departing from the spirit or scope of this invention.

What is claimed is:

1. A control switch unit of the kind comprising a casing, a bellows device defining a chamber within said casing, a conduit extending outwardly of the casing and communicating with said bellows device, and a switch arranged within the casing for operation by the bellows device, wherein the improvement consists in the casing comprising two rigid parts between which the conduit is clamped and located to position the bellows device relative to the switch upon assembly of the unit.

2. The switch unit defined in claim 1, wherein the switch has a housing and the rigid casing parts engage the switch housing to positively locate the latter relative to the bellows device.

3. The switch unit defined in claim 1, wherein the conduit includes a clevis adjacent the bellows and the casing parts have recessed portions which co-operate to define an aperture in which the clevis is located upon assembly of the unit.

4. The switch unit defined in claim 3, wherein the recessed portions comprise respective semicircular flanges on the casing parts, the clevis of the conduit having a circumferential groove in which the flanges engage upon assembly of the unit.

5. The switch unit defined in claim 3, wherein the surfaces of the recessed portions which contact the clevis have raised protuberances which are deformed upon assembly of the unit.

6. The switch unit defined in claim 3, wherein the clevis has a non-circular cross-section and the casing parts have upstanding walls surrounding the recessed portions and defining a well upon assembly of the unit, the well being shaped complementarily to the non-circular cross-section of the clevis to prevent rotation of the latter in the aperture upon assembly of the unit.

7. The switch unit defined in claim 1, wherein the bellows device has a mechanical connection to the switch, the mechanical connection comprising a lever which engages the bellows device, and the casing having means pivotally supporting the lever.

8. The switch unit defined in claim 7, wherein the lever comprises a plate having two spaced apart bearing points within the casing, and an externally adjustable member for adjusting the position of one of the said bearing points relative to the other.

9. The switch unit defined in claim 8, wherein said one of the bearing points for the lever plate comprises a cam surface on a rotatable cam adjustable by said adjustable member.

10. The switch unit defined in claim 8, wherein the lower plate engages the bellows device on a face of the plate opposite that which engages the switch.

11. The switch unit defined in claim 8, including a leaf spring attached to the lever plate, said spring having a portion which normally lies flat against the plate and which bears against the switch at a position spaced from the attachment of the spring to the plate, said leaf spring deflecting away from the plate in the event of excessive movement of the bellows device outside the normal operating range of the unit.

12. The switch unit defined in claim 1, including at least one pair of interlocking elements formed integrally with the casing parts and holding said parts together upon assembly of the unit.

13. The switch unit defined in claim 12, wherein one element of said at least one said pair is deformed after assembly of the unit to lock said casing parts together.

14. The switch unit defined in claim 1, wherein the casing parts comprise metal castings.

15. The switch unit defined in claim 2, wherein the switch housing has lateral surfaces inclined to the direction of approach of the two casing parts to interengagement, at least one of the casing parts having complementarily inclined edges which co-operate with said lateral surfaces upon assembly of the unit, achieving a wedging action substantially eliminating play in the location of the switching housing in the unit.

16. The switch unit defined in claim 1, including at least one pair of interengaging elements formed integrally with the casing parts and holding said parts together upon assembly of the unit.

* * * * *